(12) United States Patent
Brunel et al.

(10) Patent No.: US 9,055,539 B2
(45) Date of Patent: Jun. 9, 2015

(54) METHOD AND A DEVICE FOR ADJUSTING THE TRANSMISSION POWER OF SIGNALS TRANSFERRED BY PLURAL MOBILE TERMINALS

(75) Inventors: Loic Brunel, Rennes Cedex (FR); Julien Guillet, Rennes Cedex (FR); Nicolas Gresset, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 169 days.

(21) Appl. No.: 13/977,885

(22) PCT Filed: Dec. 27, 2011

(86) PCT No.: PCT/EP2011/074101
§ 371 (c)(1),
(2), (4) Date: Jul. 1, 2013

(87) PCT Pub. No.: WO2012/093057
PCT Pub. Date: Jul. 12, 2012

(65) Prior Publication Data
US 2013/0281149 A1 Oct. 24, 2013

(30) Foreign Application Priority Data
Jan. 7, 2011 (EP) .................................. 11150410

(51) Int. Cl.
*H04W 52/24* (2009.01)
*H04W 52/14* (2009.01)
(Continued)

(52) U.S. Cl.
CPC .......... *H04W 52/243* (2013.01); *H04W 52/146* (2013.01); *H04W 52/241* (2013.01); *H04W 52/242* (2013.01); *H04W 52/38* (2013.01); *H04W 84/045* (2013.01)

(58) Field of Classification Search
CPC ............ H04W 52/146; H04W 52/241; H04W 52/242; H04W 52/243; H04W 52/38; H04W 84/054
USPC ................ 455/522, 127.1, 127.5, 67.11, 501, 455/63.1, 67.13, 114.2, 226.3; 375/297, 375/267
See application file for complete search history.

(56) References Cited

U.S. PATENT DOCUMENTS 6,021,309 A * 2/2000 Sherman et al. ............. 455/12.1
6,463,279 B1 * 10/2002 Sherman et al. ............. 455/427
(Continued)

FOREIGN PATENT DOCUMENTS

| EP | 2 217 027 | 8/2010 |
|----|-----------|--------|
| WO | 2010 036188 | 4/2010 |

OTHER PUBLICATIONS

Claussen, H., "Performance of Macro and Co-Channel Femtocells in a Hierarchica Cell Structure", The 18"Annual IEEE International Symposium on Personal, Indoor and Mobile Radio Communicatiosns, pp. 1-5, (Sep. 1, 2007), XP031168593.

(Continued)

*Primary Examiner* — Minh D Dao
(74) *Attorney, Agent, or Firm* — Oblon, McClelland, Maier & Neustadt, L.L.P.

(57) ABSTRACT

A method for adjusting transmission power, in a wireless cellular telecommunication network, of signals transferred by plural mobile terminals through a wireless interface, the mobile terminals being served by at least one base station or by home base stations, the home base stations being located in the cell of the at least one base station. The method includes: obtaining at least the path gains between the mobile terminals and the at least one base station and at least one home base station; determining statistics from the obtained path gains; obtaining at least one coefficient of a function according to at least a part of the statistics; transferring an information representative of the at least one obtained coefficient to the mobile terminals.

14 Claims, 4 Drawing Sheets

(51) Int. Cl.
*H04W 52/38* (2009.01)
*H04W 84/04* (2009.01)

(56) References Cited

U.S. PATENT DOCUMENTS

| | | | |
|---|---|---|---|
| 2002/0187810 A1* | 12/2002 | Dajer et al. | 455/561 |
| 2005/0089111 A1* | 4/2005 | Liou et al. | 375/267 |
| 2006/0098758 A1* | 5/2006 | Luke et al. | 375/297 |
| 2008/0146154 A1 | 6/2008 | Claussen et al. | |
| 2008/0188265 A1 | 8/2008 | Carter et al. | |
| 2010/0197338 A1 | 8/2010 | Bonneville et al. | |
| 2011/0237244 A1 | 9/2011 | Hiltunen et al. | |
| 2012/0046055 A1 | 2/2012 | Carter et al. | |
| 2013/0286952 A1* | 10/2013 | Ghosh et al. | 370/329 |

OTHER PUBLICATIONS

International Search Report Issued Mar. 3, 2012 in PCT/EP11/074101 Filed Dec. 27, 2011.

English translation of Written Opinion in PCT/JP11/074101 Filed Dec. 27, 2011.

* cited by examiner

METHOD AND A DEVICE FOR ADJUSTING THE TRANSMISSION POWER OF SIGNALS TRANSFERRED BY PLURAL MOBILE TERMINALS

The present invention relates generally to a method and a device for adjusting the transmission power, in a wireless cellular telecommunication network, of signals transferred by plural mobile terminals through a wireless interface.

Wireless cellular telecommunication networks are largely deployed but there are still some areas not covered by the base stations of the wireless cellular telecommunication network. The base stations are deployed by an operator according to a given planning.

For example, the access to the wireless cellular telecommunication network might not be possible or might require a too high transmission power or a too low spectral efficiency, i.e., too many system resources for a mobile terminal located in a building, if the signals radiated by the base stations and/or by the mobile terminal are too attenuated.

Solutions are proposed today. Particular base stations which are not necessarily deployed by an operator and thus not following a given planning, like home base stations or femto base stations or pico base stations or relays, may provide coverage areas within the buildings and base station offload. Relays may also provide outdoor coverage extension.

The home base stations or femto base stations provide a limited coverage area. Due to the constant coverage area size reduction and spectral efficiency increase, the inter-cell interference has become a main issue. Inter-cell interference coordination (ICIC) techniques intend to mitigate the inter-cell interference problem. Classically, a mobile terminal reports to the base station the mobile terminal is currently served by, the interference it receives from neighbouring base stations and/or home base stations. Base stations exchange also messages between each other in order to allow an efficient ICIC. However, the base station to base station messages need establishment of links between the base stations. The same links between base stations and home base stations or between home base stations cannot be established in some cases.

A massive deployment of home base stations prevents from having such links between a base station and all the home base stations located within the coverage area of the base station. Even if the links exist, the amount of messages on these links must be as low as possible in order not to put an excessive burden on the core network. These home base stations may strongly interfere with the base station and even create coverage holes.

Without shadowing, the interference impact depends on the distance separating the base station and the home base station. In the uplink channel, the lower the distance between a base station and a home base station is, the higher the interference generated by mobile terminals served by the home base station on all mobile terminals served by the base station is. In the uplink channel, with power control, the higher the distance between a base station and a home base station is, the higher the interference created by mobile terminals served by the base station on all mobile terminals served by the home base station is.

With shadowing, the interference impact is not only related to the distance between the home base station and the base station. In uplink channel, the interference also depends on the shadowing between each mobile terminal served by a home base station and the base station. Thus, the higher the average path-gain between mobile terminals served by a home base station and the base station is, the higher the interference created by mobile terminals served by the home base station on all mobile terminals served by the base station is. Besides, mobile terminals served by the base station also interfere on the mobile terminals served by a home base station. With path-gain dependent power control, the lower the average path-gain between the base station and mobile terminals served by the base station at the neighbourhood of a home base station is, the higher the interference created by the mobile terminals served by the base station on all mobile terminals served by the home base station is.

The home base stations may enable a limited number of mobile terminals to access the wireless cellular telecommunication network through their respective resources. The mobile terminals allowed to access the resources of the network through the home base station may be determined by the owner of the home base station, the network or a combination of both.

The owner must be understood here in the general sense: the owner may only be the main user of the home base station, the owner may be the person who rents the home base station or the owner may be the person who accommodates the home base station in his house or office.

For example, only mobile terminals of the owner of the home base station and his family can access the wireless cellular telecommunication network through the home base station. These mobile terminals are associated with the home base station.

Base stations enable a large number of mobile terminals to access the wireless cellular telecommunication network through their respective resources. The mobile terminals allowed to access the resources of the network through the base station may be determined by the operator of the wireless cellular telecommunication network.

The cell of a base station is usually much larger than a cell of a home base station.

Inter-cell interference coordination (ICIC) techniques have been extensively discussed between base stations.

The present invention aims at avoiding that signals transferred between mobile terminals served by home base stations and the home base stations interfere on signals transferred between mobile terminals served by base stations and the base stations.

The present invention aims also at avoiding that signals transferred between mobile terminals served by base stations and the base stations interfere on signals transferred between mobile terminals served by home base stations and the home base stations.

To that end, the present invention concerns a method for adjusting the transmission power, in a wireless cellular telecommunication network, of signals transferred by plural mobile terminals through a wireless interface, the mobile terminals being served by at least one base station or by home base stations, the home base stations being located in the cell of the at least one base station, characterised in that the method comprises the steps of:

obtaining the path gains between the mobile terminals and the at least one base station and the path gains between the mobile terminals and at least one home base station, and/or noise measured at the at least one base station and/or at the home base stations, determining statistics from the obtained path gains and/or noise, obtaining at least one coefficient of a function according to at least a part of the statistics determined from the obtained path gains and/or noise, transferring an information representative of the at least one obtained coefficient to the mobile terminals in order to enable the mobile terminals to transfer signals at a transmission power derived from information representative of the at least one obtained coefficient.

The present invention concerns also a system for adjusting the transmission power, in a wireless cellular telecommunication network, of signals transferred by plural mobile terminals through a wireless interface, the mobile terminals being served by at least one base station or by home base stations, the home base stations being located in the cell of the at least one base station, characterised in that the system comprises:

means for obtaining the path gains between the mobile terminals and the at least one base station and the path gains between the mobile terminals and the home base stations and/or noise measured at the at least one base station and/or at the home base stations, means for determining statistics from the obtained path gains and/or noise, means for obtaining at least one coefficient of a function according to at least a part of the statistics determined from the obtained path gains and/or noise, means for transferring an information representative of the at least one obtained coefficient to the mobile terminals in order to enable the mobile terminals to transfer signals at a transmission power derived from information representative of the at least one obtained coefficient.

Thus, the interference of signals transferred between mobile terminals served by home base stations and home base stations on signals transferred between mobile terminals served by base stations and the base stations is controlled.

Furthermore, the interference of signals transferred between mobile terminals served by base stations and base stations on signals transferred between mobile terminals served by home base stations and the home base stations is controlled.

Finally, the noise level at each base station or home base station may be considered in order to achieve a more efficient optimisation of the performance of mobile terminals served by the at least one base station or the home base stations.

According to a particular feature, for mobile terminals served by the at least one base station, the path gains between the mobile terminals and home base stations located in the cell of the at least one base station which serves the mobile terminals are obtained and for mobile terminals served by home base stations, each path gain between a mobile terminal and only the home base station serving the mobile terminal is obtained.

Thus, the interference of all home base stations HBS is controlled, also according to the quality of the link between each mobile terminal and its serving home base station or base station. The interference of mobile terminals MT served by a home base station on another home base station is not considered in order to avoid a too large complexity.

According to a particular feature, the function is defined for a continuous range of real values or a plurality of coefficients are obtained, the coefficients being entries of a table representing the function.

Thus, a good complexity/performance trade-off can be chosen. The optimisation of a function defined for a continuous range of real values is easier to achieve whereas tables representing a function may provide a better performance.

According to a particular feature, each path gain is a path gain between one home base station serving one mobile terminal and said mobile terminal or the path gain between one base station serving one mobile terminal and said mobile terminal or the path gain between one home base station not serving one mobile terminal and said mobile terminal or the path gain between one base station not serving one mobile terminal and said mobile terminal.

Thus, the path gains for both useful signals and interfering signals are considered in order to achieve a more efficient optimisation.

According to a particular feature, a set of at least one coefficient of the function is determined for each home base station and for the at least one base station.

Thus, a case-by-case power control, for each home base station or base station is applied in order to take into account the home base station or base station environment.

According to a particular feature, a same set of at least one coefficient is determined for all the home base stations.

Thus, a common power control is applied to all home bases stations in order to reduce the signalling amount in the network and the optimisation complexity.

According to a particular feature, the path gains are obtained by the home base stations and the at least one base station and statistics are determined by the home base stations and the at least one base station.

Thus, signalling is reduced in the network since the home base stations and the at least one base station only transfer statistics common to all mobile terminals they serve or they have served instead of transferring one particular data per mobile terminal.

According to a particular feature, the at least one coefficient of the function is obtained by the base station or by a server of the wireless cellular telecommunication network.

Thus, the at least one coefficient of the function is obtained in a centralised manner, which achieves a better performance.

According to a particular feature, information representative of the at least one obtained coefficient is transferred to each mobile terminal via the base station serving the mobile terminal or via the home base station serving the mobile terminal.

Thus, even if the at least one coefficient of the function is optimised based on statistics on many mobile terminals and is specific to a home base station or base station or even common to many home base stations, the transmit power for each mobile terminal still depends on some parameters which are specific to the mobile terminal, like for instance the path gain between the mobile terminal and its serving base station or home base station. Thus, mobile terminal specific transmission power is applied, which achieves a better performance.

According to a particular feature, when the at least one coefficient of the function is obtained by the server, the at least one base station transfers to the server the harmonic mean of noise measured at the at least one base station and/or the mean of noise measured at the at least one base station and/or the mean over all mobile terminals served or having been served by the at least one base station of ratios of the path gain between a mobile terminal and a home base station over the path gain between the mobile terminal and its serving base station.

Thus, thanks to this reduced signalling through the network between the base station and the server, different types of power control, specific to each home base station or common to many home base stations, with a power control function depending on a single path gain or on a couple of path gain or with a power control function being a look-up table can be applied.

According to a particular feature, each home base station transfers to the base station in the cell of which the home base station is located or to the server, the mean over all mobile terminals served or having been served by the home base station of ratio of the path gain between a mobile terminal served by a home base station and the base station over the path gain between the mobile terminal served by a home base station and the home base station and/or the harmonic mean of noise measured at the home base station and/or the mean of the noise measured at the home base station and/or the mean over all mobile terminals served or having been served by the home base station of the path gain between a mobile terminal served by a home base station and the base station and/or the standard deviation over all mobile terminals served or having been served by the home base station of the path gain between a mobile terminal served by a home base station and the base station and/or the load of the home base station and/or the harmonic mean over all mobile terminals served or having been served by the home base station of the path gain between a mobile terminal served by a home base station and the home base station, the mean over all mobile terminals served or having been served by the home base station of the path gain between a mobile terminal served by the home base station and the home base station and/or the standard deviation over all mobile terminals served or having been served by the home base station of the path gain between a mobile terminal served by the home base station and the home base station.

Thus, thanks to this reduced signalling through the network between the home base station and the base station in the cell of which the home base station is located, different types of power control, specific to each home base station or common to many home base stations, with a power control function depending on a single path gain or on a couple of path gain or with a power control function being a look-up table can be applied.

According to still another aspect, the present invention concerns computer programs which can be directly loadable into a programmable device, comprising instructions or portions of code for implementing the steps of the method according to the invention, when said computer programs are executed on a programmable device.

Since the features and advantages relating to the computer programs are the same as those set out above related to the method and device according to the invention, they will not be repeated here.

The characteristics of the invention will emerge more clearly from a reading of the following description of example embodiments, the said description being produced with reference to the accompanying drawings, among which:

Figure 5:
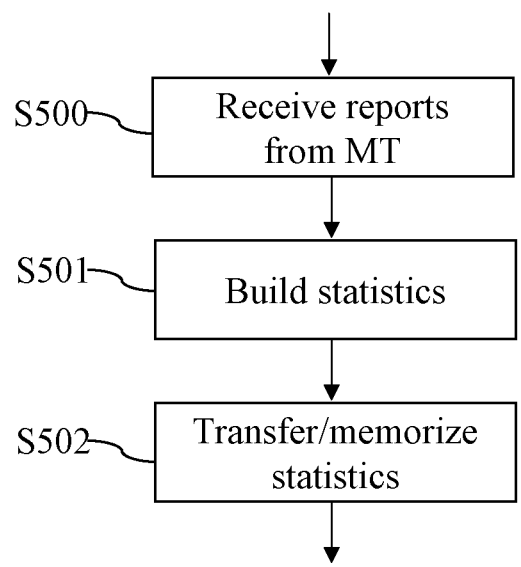
Figure 6:
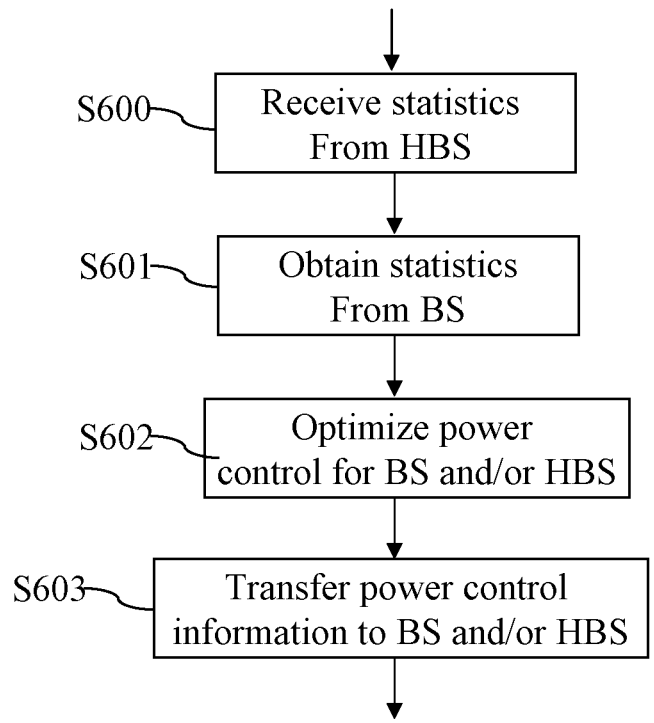
Figure 7:
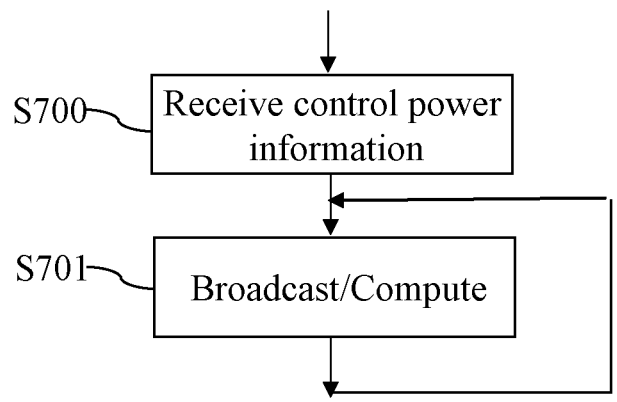

FIG. 5 discloses an algorithm executed by each home base station and each base station according to the present invention;

FIG. 6 discloses an algorithm executed by each base station or the server according to the present invention;

FIG. 7 discloses an algorithm executed by each home base station and each base station according to the present invention.

Figure 1:
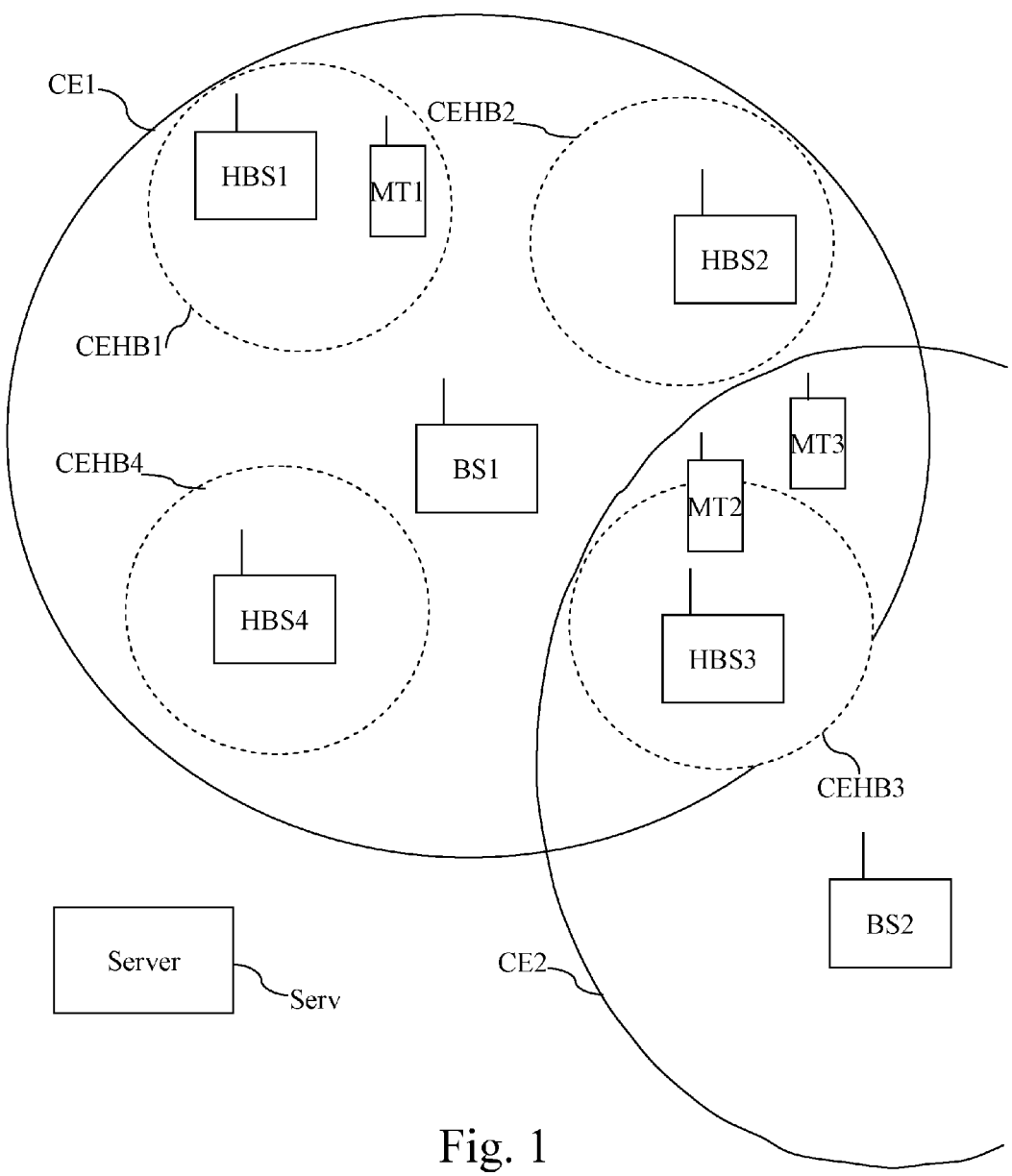
FIG. 1 represents a wireless cellular telecommunication network in which the present invention is implemented.

FIG. 1 represents a wireless cellular telecommunication network in which the present invention is implemented.

In FIG. 1, two base stations BS1 and BS2 and plural home base stations HBS1 to HBS4 of a wireless cellular telecommunication network are shown.

Only two base stations BS1 and BS2 and four home base stations HBS1 to HBS4 are shown but we can understand that the present invention works when a more important number of base stations BS and/or home base stations HBS exist.

The base stations BS1 and BS2 are for example base stations of a wireless cellular telecommunication network which serve mobile terminals located in the cell CE1 of the base station BS1 and/or in the cell CE2 of the base station BS2.

Only three mobile terminals MT1, MT2 and MT3 are shown in FIG. 1 for the sake of clarity.

The home base stations HBS1 to HBS4 are named also femto base stations or pico base stations or relays.

For example, a relay is a home base station HBS which is connected to the wireless cellular telecommunication network via a wireless link with the base station BS1 or BS2.

Each home base station HBS1 to HBS4 is for example located into home and may enable mobile terminals MT associated to the home base station HBS to access the wireless cellular telecommunication network.

For example, the home base stations HBS1 and HBS4 are located in the same building.

For example, a home base station HBS and a mobile terminal MT are associated when the home base station HBS belongs to the owner of the mobile terminal MT or when the home base station HBS belongs to the family or friends of the owner of the mobile terminal MT.

When a mobile terminal MT is served by a base station BS or a home base station HBS, it can receive or establish or continue a communication with a remote telecommunication device through the base station BS or the home base station HBS.

The base station BS1 is able to receive signals transferred by mobile terminals MT1, MT2 and MT3 which are located in the area or cell CE1. The base station BS1 transfers signals which can be received and processed by mobile terminals MT1, MT2 and MT3 located in the cell CE1. The base station BS2 is able to receive signals transferred by mobile terminals MT2 and MT3 which are located in the area or cell CE2. The base station BS2 transfers signals which can be received and processed by mobile terminals MT2 and MT3 located in the cell CE2.

In the example of FIG. 1, the base stations BS1 and BS2 have only one respective cell CE1 and CE2. The present invention is also applicable when the base stations BS have plural cells. In that case, the present invention is applied independently for each cell of the base stations BS.

The home base stations HBS1 to HBS4 are comprised in the cell CE1 of the base station BS1. The home base station HBS3 is also comprised in the cell CE2 of the base station BS2.

The home base stations HBS1 to HBS4 radiate signals which can be received and processed by mobile terminals MT1 and MT2 in their respective cell.

The home base station HBS1 is able to receive signals transferred by the mobile terminal MT1 which is located in the area or cell CEHB1. The home base station HBS1 transfers signals which can be received and processed by the mobile terminal MT1 located in the cell CEHB1.

The home base station HBS3 is able to receive signals transferred by the mobile terminal MT2 which is located in the area or cell CEHB3. The home base station HBS3 transfers signals which can be received and processed by the mobile terminal MT2 located in the cell CEHB3.

The area CEHB2 is the cell of the home base station HBS2. The area CEHB4 is the cell of the home base station HBS4.

The mobile terminal MT3 is served by the base station BS1. The signals transferred by mobile terminals MT1 and MT2 and served by the home base station HBS1 and HBS3, respectively, interfere on signals transferred by the mobile terminal MT3 and received by the base station BS1. The mobile terminal MT2 is served by the home base station HBS3. The signals transferred by mobile terminal MT3 and served by the base station BS1 interfere on signals transferred by the mobile terminal MT2 and received by the base station HBS3.

In FIG. 1, a server Serv is shown. The server Serv is a core network device that may control plural cells of plural base stations BS and may execute the present algorithm instead of the base station BS. The server Serv may also be named a coordinator.

According to the invention, the base station BS performs in combination with home base stations HBS or the server Serv performs in combination with at least one base station BS and home base stations HBS inter cell interference coordination procedure by:
  obtaining the path gains between the mobile terminals MT and the at least one base station BS and the path gains between the mobile terminals MT and at least one home base station HBS, and/or noise measured at the at least one base station BS and/or at the home base stations HBS,
  determining statistics from the obtained path gains and/or noise measured at the at least one base station BS and/or at the home base stations HBS,
  obtaining at least one coefficient of a function according to at least a part of the statistics determined from the obtained path gains,
  transferring an information representative of the at least one obtained coefficient to the mobile terminals MT in order to enable the mobile terminals MT to transfer signals at a transmission power derived from information representative of the at least one obtained coefficient.

According to the invention, the transmit power of the mobile terminals MT1 and MT2 served by a home base station HBS and the transmit power of the at least one mobile terminal MT3 served by a base station BS is set in order to optimize the link conditions between mobile terminals served by a home base station HBS and the home base station HBS and link conditions between mobile terminals served by a base station BS and the base station BS.

According to the particular example of FIG. 1, the link conditions are the Signal to Interference plus Noise Ratios (SINR) of mobile terminals MT1 and MT2 served by a home base station HBS and at least the mobile terminal MT3 served by a base station BS.

According to the invention, each mobile terminal MT served by a base station BS reports the path gain between itself and the base station BS it is served by and/or the path gain between itself and at least one base station BS which serves interfering mobile terminals and/or the path gain between itself and home base stations HBS.

An interfering mobile terminal MT is a mobile terminal MT which radiates signals which interfere at least one base station BS or at least one home base station HBS which does not serve said interfering mobile terminal MT.

Each mobile terminal MT served by a home base station HBS reports the path gain between itself and the home base station HBS it is served by and/or between itself and at least one base station BS which serves interfering mobile terminals.

Each base station BS builds statistics from the path gains reports transferred by each mobile terminal MT served and/or which have been served by said base station BS. The statistics may be transferred to the server Serv.

In a variant, each base station BS also builds statistics on the noise level it receives. The statistics may be transferred to the server Serv.

Each home base station HBS builds statistics from the path gains reports transferred by each mobile terminal MT served and/or which have been served by said home base station HBS. The statistics are transferred to the base station BS the cell CE of which the home base station HBS is located in or to the server Serv.

In a variant, each home base station HBS also builds statistics on the path gain between itself and the base station BS the cell CE of which the home base station HBS is located in.

In a variant, each home base station HBS also builds statistics on the noise level it receives. The statistics may be transferred to the server Serv or to a base station BS.

Statistics may be transferred periodically, each hour or on a day basis.

The base station BS optimizes the power control rule for all mobile terminals MT served by a home base station HBS located in the cell CE of the base station BS and according to particular examples for the mobile terminals MT served by the base station BS.

Alternatively, the server Serv optimizes the power control rule for all mobile terminals MT served by a home base station HBS located in the cell of a base station BS the server Serv is in charge of and for all the mobile terminals MT served by the base stations BS the server Serv is in charge of.

According to the invention, the power control rule is a function f of the pair useful path gain, interfering path gains wherein the useful path gain is the path gain between a mobile terminal MT and its serving home base station HBS or its serving base station BS. An interfering path gain is a path gain between an interfering mobile terminal MT and a base station BS which does not serve said interfering mobile terminal MT or is a path gain between an interfering mobile terminal MT and a home base station HBS which does not serve said interfering mobile terminal MT. The home base station HBS is located in the cell CE of the base station BS or close to the cell CE of the base station BS. Alternatively, the power control rule is a function f of a pair of useful link quality and interfering link quality. For instance a useful link quality is a ratio of useful path gain over noise.

Each home base station HBS receives the power control rule which is the function f, analytically defined or defined as a look-up table and the coefficients and transfers the power control rule and the coefficients or the transmission power to be used by each mobile terminal MT to each mobile terminal MT the home base station HBS serves.

In a variant, each home base station HBS receives the coefficients of the power control rule and transfers to the mobile terminal MT, the power control rule and the coefficients or the coefficients or the transmission power to be used by each mobile terminal MT to each mobile terminal MT the home base station HBS serves. The coefficients of the power control rule may be entries of a table representing the function, i.e. a look up table.

Each base station BS may receive the power control rule which is the function f, analytically defined or defined as a look-up table and the coefficients and transfers the power control rule and the coefficients or the transmission power to be used by each mobile terminal MT to each mobile terminal MT the base station BS serves.

In a variant, each base station BS may receive the coefficients of the power control rule and transfers to the mobile terminal MT, the power control rule and the coefficients or the coefficients or the transmission power to be used by each mobile terminal MT to each mobile terminal MT the base station BS serves. The coefficients of the power control rule may be entries of a table representing the function, i.e. a look up table.

The power optimisation is for example executed as it will be disclosed hereinafter.

For example, the power control optimisation is done by choosing a structure which may be analytical or under the form of a look-up table for the function f and by choosing the best function or function coefficient or coefficients which define a given function for optimising a given criterion. The optimisation may be analytical or numerical i.e. by testing many functions or coefficient sets and keeping the best one.

The numerical/analytical optimisation may be done with a given structure for the power setting function f, e.g., affine in dB and/or within a given range between $f_{min}$ and $f_{max}$. For instance, if $f(x)=a \cdot x + b$, the coefficients a and b of the function f are optimised.

For instance, when using look-up tables, function f depending on variable x, which might be a vector of variables, is described by quantifying x to a given set of discrete values. For instance, each dimension of x is quantified by choosing a quantification range $[x_{min}, x_{max}]$ and a quantification step. The global optimisation results in choosing the best look-up table, i.e., the best value of f for each discrete value of x, according to the criterion to optimise.

The optimisation criterion may be a quantile or mean of a given random value if there is a single random value to take into account or a function of several random values like a sum of quantiles, sum of means, quantiles of quantiles, quantiles of means, quantile on all random values.

The given random value may be specific to all the mobile terminals MT served by the same home base station HBS or the same base station BS in case of a single random value. For instance, the optimisation could ensure that the degradations brought on a base station BS by all the mobile terminals MT served by all home base stations HBS located in the cell CE of the base station BS and by the mobile terminals MT served by the base station BS on each home base station HBS located in the cell CE of the base station BS are the same.

For example, in order to perform this optimisation, a random value may be the ratio of the signal SINR without interference over SINR with interference. For example, a random value in order to perform this optimisation may be the ratio of Shannon capacity without interference over Shannon capacity with interference.

These ratios depend on function f. Interference means the signals transferred by a mobile terminal MT served by a base station BS or a home base station HBS which interferes or reduces capacity on uplink signals received by another base station BS or another home base station HBS not serving said mobile terminal MT.

Uplink signals are signals received by a home base station HBS or a base station BS from a mobile terminal MT served by said home base station HBS or said base station BS.

Uplink signals are not signals received by a home base station HBS or a base station BS from a mobile terminal MT not served by said home base station HBS or said base station BS.

The given random value may be global for all the mobile terminals MT served by all home base stations HBS located in a cell CE of at least one base station BS.

For instance, the optimisation could ensure that the degradation brought by all the mobile terminals MT served by all the home base stations HBS located in a cell CE of a base station BS on uplink signals received by the base station BS is set with respect to the degradation brought by the mobile terminals MT served by the base station BS on all the uplink signals received by the home base stations HBS located in the cell of the base station BS.

For instance, the degradation brought by the base station BS on the uplink signals received by the home base stations HBS is the mean degradation brought by the mobile terminals MT served by the base station BS on all the uplink signals received by all the home base stations HBS located in the cell of the base station BS.

For example, a random value in order to perform this optimisation may be the ratio of the signal SINR without interference over SINR with interference. For example, a random value in order to perform this optimisation may be the ratio of Shannon capacity without interference over Shannon capacity with interference. These ratio may depend on function f. Interference means base station BS uplink signals interference or capacity reduction on uplink signals received by each home base station HBS and means interference or capacity reduction of all the home base stations HBS located in the cell CE of a base station BS on the uplink signals received by the base station BS.

In another example, the optimisation could ensure that the degradation brought by all the mobile terminals MT served by a home base station HBS located in a cell CE of a base station BS on the base station BS performance is set to a given value and ensure that the performance of the home base stations HBS is maximised.

According to the invention, statistics reported from the base stations BS and home base stations HBS may be quantized, e.g. using a basis of predetermined functions or the mean and/or variance of a given distribution like a Gaussian distribution of a random variable which may be expressed in decibels (dB) and/or histograms. Generally, thanks to the high variance of the shadowing compared to the distance-dependent propagation loss distribution variance, the Gaussian distribution is a good solution for path gains in dB.

Figure 2:
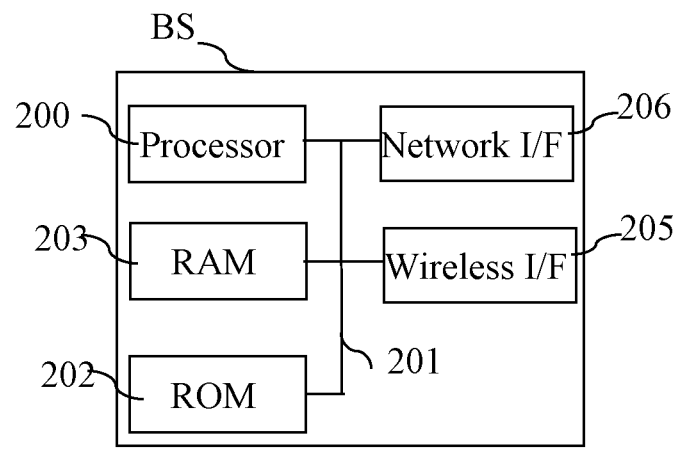
FIG. 2 is a diagram representing the architecture of a base station in which the present invention is implemented.

FIG. 2 is a diagram representing the architecture of a base station in which the present invention is implemented.

The base station BS has, for example, an architecture based on components connected together by a bus 201 and a processor 200 controlled by the programs as disclosed in FIGS. 5, 6 and 7.

The bus 201 links the processor 200 to a read only memory ROM 202, a random access memory RAM 203, a wireless interface 205 and a network interface 206.

The memory 203 contains registers intended to receive variables and the instructions of the programs related to the algorithms as disclosed in FIGS. 5, 6 and 7.

The processor 200 controls the operation of the network interface 206 and of the wireless interface 205.

The read only memory 202 contains instructions of the programs related to the algorithms as disclosed in FIGS. 5, 6 and 7, which are transferred, when the base station BS is powered on, to the random access memory 203.

The base station BS may be connected to a telecommunication network through the network interface 206. For example, the network interface 206 is a DSL (Digital Subscriber Line) modem, or an ISDN (Integrated Services Digital Network) interface, etc. Through the network interface 206, the base station BS may transfer messages to the core network of the wireless cellular telecommunication network.

The wireless interface 205 and the network interface 206 are the resources of the base station BS used by a mobile terminal in order to access to the wireless cellular telecommunication network when the mobile terminal establishes or receives a communication with a remote telecommunication device.

Figure 3:
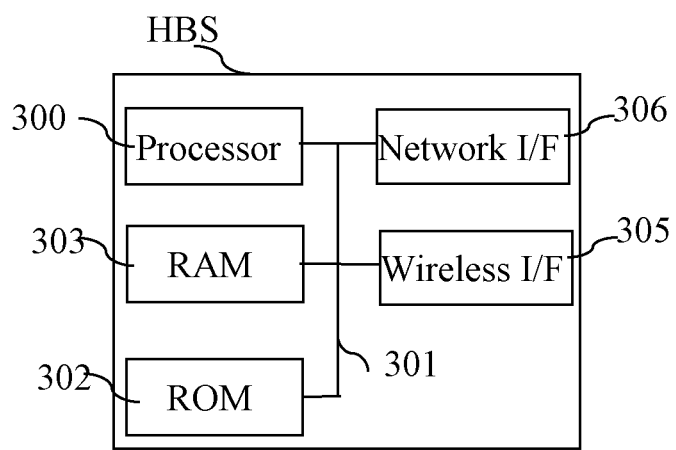
FIG. 3 is a diagram representing the architecture of a home base station in which the present invention is implemented.

FIG. 3 is a diagram representing the architecture of a home base station in which the present invention is implemented.

The home base station HBS has, for example, an architecture based on components connected together by a bus 301 and a processor 300 controlled by the programs as disclosed in FIGS. 5 and 7.

The bus 301 links the processor 300 to a read only memory ROM 302, a random access memory RAM 303, a wireless interface 305 and a network interface 306.

The memory 303 contains registers intended to receive variables and the instructions of the programs related to the algorithms as disclosed in FIGS. 5 and 7.

The processor 300 controls the operation of the network interface 306 and of the wireless interface 305.

The read only memory 302 contains instructions of the program related to the algorithms as disclosed in FIGS. 5 and 7, which are transferred, when the home base station HBS is powered on, to the random access memory 303.

The home base station HBS may be connected to a telecommunication network through the network interface 306. For example, the network interface 306 is a DSL (Digital Subscriber Line) modem, or an ISDN (Integrated Services Digital Network) interface or a wireless link linking the home base station HBS to the base station BS, etc. Through the network interface 306, the home base station HBS may transfer messages to the core network of the wireless cellular telecommunication network.

The wireless interface 305 and the network interface 306 are the resources of the home base station HBS used by a mobile terminal in order to access to the wireless cellular telecommunication network when the mobile terminal establishes or receives a communication with a remote telecommunication device.

Figure 4:
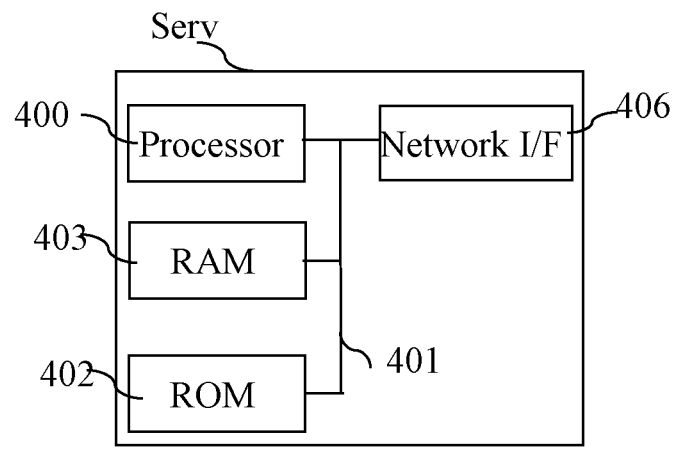
FIG. 4 is a diagram representing the architecture of a server in which the present invention is implemented.

FIG. 4 is a diagram representing the architecture of a server in which the present invention is implemented.

The server Serv has, for example, an architecture based on components connected together by a bus 401 and a processor 400 controlled by the program as disclosed in FIG. 6.

The bus 401 links the processor 400 to a read only memory ROM 402, a random access memory RAM 403 and a network interface 406.

The memory 403 contains registers intended to receive variables and the instructions of the programs related to the algorithm as disclosed in FIG. 6.

The processor 400 controls the operation of the network interface 406.

The read only memory 402 contains instructions of the program related to the algorithm as disclosed in FIG. 6, which are transferred, when the server Serv is powered on, to the random access memory 403.

The server Serv is connected to the telecommunication network through the network interface 406. For example, the network interface 406 is a DSL (Digital Subscriber Line) modem, or an ISDN (Integrated Services Digital Network) interface, etc. Through the network interface 406, the server Serv may transfer messages to the core network and/or base stations BS and/or home base stations of the wireless cellular telecommunication network.

FIG. 5 discloses an algorithm executed by each home base station and each base station according to the present invention.

More precisely, the present algorithm is executed by the processor 200 of each base station BS and by the processor 300 of each home base station HBS.

At step S500, the processor 200 detects the reception through the wireless interface 205 of measurement reports transferred by mobile terminals MT the base station BS serves.

Each measurement report may comprise the path gain between the serving base station BS and the mobile terminal MT which transfers the report, the path gain between the mobile terminal MT which transfers the report and base station BS interfered by the mobile terminal MT which transfers the report and the path gains between the mobile terminal MT which transfers the report and each home base station HBS interfered by the mobile terminal MT.

It has to be noted here that different measurement reports may be received. Each measurement report may comprise one or several above mentioned information.

The measurement reports may be accumulated during a given period of time like an hour or like a day.

Each base station BS and each home base station HBS are identified in the report. It has to be noted here that in a variant, instead of path gains, the report or reports may include received power measurements. In this case, the transmit power by base station BS and by home base stations HBS must be known by the base station BS or the server Serv.

In a similar way, the processor 300 detects the reception through the wireless interface 305 of measurement reports transferred by mobile terminal MT the home base station HBS serves.

Each measurement report may comprise the path gain between the serving home base station HBS and the mobile terminal MT which transfers the report, the path gain between the mobile terminal MT which transfers the report and base station BS interfered by the mobile terminal MT which transfers the report and the path gains between the mobile terminal MT which transfers the report and each home base station HBS interfered by the mobile terminal MT.

It has to be noted here that different measurement reports may be received. Each measurement report may comprise one or several above mentioned information.

The measurement reports may be accumulated during a given period of time like an hour or like a day.

Each base station BS and each home base station HBS are identified in the report. It has to be noted here that in a variant, instead of path gains, the report may include received power measurements. In this case, the transmit power by base stations BS and by home base stations HBS must be known by the home base station HBS or the base station BS or the server Serv.

At next step S501, the processor 200 builds statistics from the received reports. The statistics are generally on a long term basis using former reports received from mobile terminals MT which are no more served by the base station BS. At the same time the level of additive white Gaussian noise including thermal noise (AWGN) is obtained from the wireless interface 205.

It has to be noted here that the signals transferred by mobile terminals MT which are served by another base station BS or another home base station HBS may be considered as a part of noise level, in addition to additive white Gaussian noise. This level is named hereinafter AWGN plus interference level In a similar way, the processor 300 builds statistics from the received reports. The statistics may be built on a long term basis using former reports received from mobile terminals MT which are no more served by the base station BS. At the same time AWGN plus interference level, is obtained from the wireless interface 305.

It has to be noted here that the signals transferred by mobile terminals MT which are served by another base station BS or home base station HBS may be considered as a part of AWGN plus interference level by the home base station HBS.

At next step S502, the processor 200 commands the memorizing in the RAM memory 203 of the built statistics and commands the transfer, through the network interface 206, of the built statistics to the server Serv when the server Serv executes the algorithm which will be disclosed in reference to FIG. 6.

In a similar way, the processor 300 commands the memorizing in the RAM memory 303 of the built statistics and commands the transfer, through the network interface 306, of the built statistics to the server Serv when the server Serv executes the algorithm of FIG. 6 or to the base station BS when the base station BS executes the algorithm of FIG. 6.

After that, the algorithm returns to step S500.

FIG. 6 discloses an algorithm executed by each base station or the server according to the present invention.

More precisely, the present algorithm is executed by the processor 200 of the base station BS or by the processor 400 of the server serv.

At step S600, the processor 200 detects the reception through the network interface 206 or through the wireless interface 205 of statistics transferred by the home base stations HBS which are located in the cell CE of the base station BS.

Alternatively, the processor 400 detects the reception through the network interface 406 of statistics transferred by the home base stations HBS which are located in the cell CE of each base station BS the server Serv is in charge of. The statistics may be transferred via the base station BS the cell CE of which home base stations HBS are located in.

At step S601, the processor 200 reads from the RAM memory 203 statistics built at step S501 of FIG. 5.

Alternatively, the processor 400 detects the reception through the network interface 406 of statistics transferred by each base station BS the server Serv is in charge of.

At next step S602 the processor 200 optimises the power control rule of the base station BS and of the home base stations HBS which are located in the cell CE of the base station BS.

Alternatively, the processor 400 optimises the power control rule of the base stations BS it is in charge of and of the home base stations HBS which are located in the cells of the base stations BS the server Serv is in charge of.

The power control rule optimisation is based on at least one function f determination.

According to a first example of realization of the present invention, the function f is specific to each cell CE or CEHB of a base station BS or a home base station HBS. The considered power control inverts the path gain between a mobile terminal MT served by the base station BS and the base station BS or the path gain between a mobile terminal MT and the home base station HBS serving the mobile terminal MT:

$$f\ G^U = \frac{\beta}{G^U},$$

where $G^U$ is the useful path gain from the mobile terminals MT and the base station BS or the home base station HBS serving a mobile terminal MT. $\beta$ is a scalar value associated to the function and to be optimised.

The resulting power control with this function is for mobile terminal MTj served by a home base station HBSi:

$$P_{i,j}^F = f_i^F G_{i,j}^F = \frac{\beta_i^F}{G_{i,j}^F}$$

where $(\ )^F$ denotes the home base station HBS and $G_{i,j}^F$ is the path gain between the mobile terminal MTj served by the home base station HBSi and the home base station HBSi.

The resulting power control with this function is for the mobile terminal MTk served by a base station BS $$P_k^M = f^M\ G_k^K = \frac{\beta^M}{G_k^M}$$

where $(\ )^M$ denotes for the base station BS and $G_k^M$ is the path gain between the mobile terminal MTk served by the base station BS and the base station BS.

The optimisation ensures that the degradation brought by all the interfering mobile terminals MT served by home base stations HBS on the base station BS performance and by the mobile terminals MT served by the base station BS on each home base station HBS performance is the same.

The performance degradation is expressed by a SINR ratio of SINR without interference over SINR with interference. At a base station BS, the ratio, denoted $SR^M$, is the SINR without interference of interfering mobile terminals MT served by home base station HBS over the SINR with interference of interfering mobile terminals MT served by home base station HBS.

At a home base station HBS, the ratio, denoted $SR_i^F$, is the SINR without interference of interfering mobile terminals MT served by the base station BS over the SINR with interference of interfering mobile terminals MT served by the base station BS.

With the chosen function f, the ratios are as follows:

$$SR_i^F = \frac{SINR_i^{FwoM}}{SINR_i^{FwM}} = \frac{\frac{\beta_i^{FwoM}}{N_i^F}}{\frac{\beta_i^{FwM}}{\beta^{MwF}\frac{G_i^{MF}}{G^M} + N_i^F}} = \frac{\beta_i^{FwoM}}{\beta_i^{FwM}}\left(\beta^{MwF}\frac{G_i^{MF}}{G^M N_i^F} + 1\right)$$

$$SR^M = \frac{SINR^{MwoF}}{SINR^{MwF}} = \frac{\frac{\beta^{MwoF}}{N^M}}{\frac{\beta^{MwF}}{\sum_{i=1}^{N_f}\beta_i^{FwM}\frac{G_i^{FM}}{G_i^F} + N^M}} = \frac{\beta^{MwoF}}{\beta^{MwF}}\left(\sum_{i=1}^{N_f}\beta_i^{FwM}\frac{G_i^{FM}}{G_i^F N^M} + 1\right)$$

where FwoM denotes at home base station HBS without interference of interfering mobile terminals MT served by base station BS, FwM denotes at home base station HBS with interference of interfering mobile terminals MT served by base station BS, MwoF denotes at base station BS without interference of interfering mobile terminals MT served by home base stations HBS, MwF denotes at base station BS with interference of interfering mobile terminals MT served by home base stations HBS, $N^M$ is the level of AWGN plus interference level from neighbouring cells CE of the cell of the base station BS at the base station BS, $N_i^F$ is the level of AWGN plus interference from neighbouring cells CE of the cell of the base station BS in which the home base station HBS is located at the home base station HBS, $G_i^{FM}$ is the path gain between a mobile terminal MT served by home base station HBSi and the base station BS, $G_i^{MF}$ is the path gain between the home base station HBSi and a mobile terminal MT served by base station BS. Note that indices j and k are omitted here, since the optimisation process does not consider a mobile terminal MT in particular. Thus, path gains are random variables.

For the optimisation, the mean degradation over all potential positions of mobile terminals MT served by a base station BS and the mean degradation over all potential positions of mobile terminals MT served by a home base station HBS are considered and the following equations have to be solved:

$$E[SR_i^F] = E\left[\frac{SINR_i^{FwoM}}{SINR_i^{FwM}}\right] = \frac{\beta_i^{FwoM}}{\beta_i^{FwM}}\left(\beta^{MwF}E\left[\frac{G_i^{MF}}{G^M N_i^F}\right]+1\right) = \delta$$

$$E[SR^M] = E\left[\frac{SINR^{MwoF}}{SINR^{MwF}}\right] = \frac{\beta^{MwoF}}{\beta^{MwF}}\left(E\left[\sum_{i=1}^{N_f}\beta_i^{FwM}\frac{G_i^{FM}}{G_i^F N^M}\right]+1\right) = \delta$$

where $E\ X=\bar{X}$ denotes the mean of variable X Different beta values are chosen with ($\beta_i^{FwM}$, $\beta^{MwF}$) and without interference ($\beta_i^{FwoM}$, $\beta^{MwoF}$). For instance, the ($\beta_i^{FwoM}$, $\beta^{MwoF}$) values without interference are already known.

After analytical system derivation, we obtain the following solution, $$\beta^{MwF} = \beta^{MwoF}\frac{1+\frac{1}{{}^H\bar{N}^M}\sum_{i'=1}^{N_f}\beta_{i'}^{FwoM}\bar{z}_{i'}^F}{\delta - \frac{\beta^{MwoF}}{\delta {}^H\bar{N}^M}\sum_{i'=1}^{N_f}\beta_{i'}^{FwoM}\frac{\bar{z}_i^M \bar{z}_{i'}^F}{{}^H\bar{N}_i^F}}$$

$$\beta_i^{FwM} = \frac{\beta_i^{FwoM}}{\delta}\left(\frac{\bar{z}_i^M}{{}^H\bar{N}_i^F}\beta^{MwoF}\frac{1+\frac{1}{{}^H\bar{N}^M}\sum_{i'=1}^{N_f}\beta_{i'}^{FwoM}\bar{z}_{i'}^F}{\delta - \frac{\beta^{MwoF}}{\delta {}^H\bar{N}^M}\sum_{i'=1}^{N_f}\beta_{i'}^{FwoM}\frac{\bar{z}_i^M \bar{z}_{i'}^F}{{}^H\bar{N}_i^F}}+1\right)$$

where $\bar{z}_i^M = E\left[\frac{G_i^{MF}}{G^M}\right]$, ${}^H\bar{N}^M = \frac{1}{E\left[\frac{1}{N^M}\right]}$, $\bar{z}_i^F = E\left[\frac{G_i^{FM}}{G_i^F}\right]$ and ${}^H\bar{N}_i^F = \frac{1}{E\left[\frac{1}{N_i^F}\right]}$.

Alternatively, the ($\beta_i^{FwoM}$, $\beta^{MwoF}$) values without interference are not already known, they may be determined also by the base station BS or by the server Serv.

For instance, the ($\beta_i^{FwoM}$, $\beta^{MwoF}$) values without interference can be chosen such that each home base station HBS cell has the same average SINR and that the base station BS the cell of which comprises the home base stations HBS has a given mean SINR:

$$\beta^{MwF} = \alpha^M\ {}^H\bar{N}^M\frac{1+\frac{\alpha^F}{{}^H\bar{N}^M}\sum_{i'=1}^{N_f}{}^H\bar{N}_{i'}^F\bar{z}_{i'}^F}{\delta - \frac{\alpha^M \alpha^F}{\delta}\sum_{i'=1}^{N_f}\bar{z}_i^F\bar{z}_{i'}^F}$$

$$\beta_i^{FwM} = \frac{\alpha^F\ {}^H\bar{N}_i^F}{\delta}\left(\frac{\bar{z}_i^M \alpha^M\ {}^H\bar{N}^M}{{}^H\bar{N}_i^F}\frac{1+\frac{\alpha^F}{{}^H\bar{N}^F}\sum_{i'=1}^{N_f}{}^H\bar{N}_{i'}^F\bar{z}_{i'}^F}{\delta - \frac{\alpha^M \alpha^F}{\delta}\sum_{i'=1}^{N_f}\bar{z}_i^M\bar{z}_{i'}^F}+1\right)$$

where $\alpha^F$ is the target SINR of all mobile terminals MT served by home base stations HBS and $\alpha^M$ is the target SINR of all mobile terminals MT served by the base station BS the cell CE of which comprises the home base stations HBS.

The expressions of optimum β values $\beta_i^{FwM}$ depend on two statistics for each home base station HBS received at step S600 and 1+$N_f$ statistics obtained at step S601 for one base station BS the cell CE of which comprises the home base stations HBS, where $N_f$ is the number of home base stations HBS in the cell CE of the base station BS.

The statistics flows from a base station BS to the server Serv when the present algorithm is executed by the server Serv, comprise the mean over all mobile terminals currently or previously served by the base station BS of path gain ratios i.e. the path gain between mobile terminal MT and home base station HBSi over the path gain between mobile terminal MT and base station BS for each interfered home base station HBSi $$\bar{z}_i^M = E\left[\frac{G_i^{MF}}{G^M}\right]$$

where $G^M$ denotes the path gain between a mobile terminal MT served by a base station BS and the base station BS and $G_i^{MF}$ denotes the path gain between a mobile terminal MT served by a base station BS and the home base station HBSi located in the cell CE of the base station BS. The statistic flows comprise also the harmonic mean of noise AWGN plus interference level, on base station BS $${}^H\bar{N}^M = \frac{1}{E\left[\frac{1}{N^M}\right]}.$$

The statistics flows from a home base station HBS to the server Serv are when the present algorithm is executed by the server Serv or the statistics flows from a home base station HBS to the base station BS are when the present algorithm is executed by the base station BS, the mean over all mobile terminals MT served by the home base station HBS of path gain ratios, i.e. the path gain between a mobile terminal MT served by a home base station HBS and the base station BS over the path gain between the mobile terminal MT served by a home base station HBS and the home base station HBS for each home base station HBSi, $$z_i^F = E\left[\frac{G_i^{FM}}{G_i^F}\right],$$

and are the harmonic mean of noise on the home base station HBSi located in the cell CE of the base station BS $$^H\overline{N}_i^F = \frac{1}{E\left[\frac{1}{N_i^F}\right]}$$

Each home base station HBS sends two values. The base station BS sends $N_f+1$ values to the server Serv when the present algorithm is executed by the server Serv.

The server Serv or the base station BS processes the statistics and outputs one optimum $\beta$ value for each home base station HBS and one optimum $\beta$ value for the base station BS.

According to a second example of realization of the present invention, the power setting at the base station BS is already set and a global power setting for the home base stations HBS located in the cell of the base station BS needs to be determined.

The function f is common to all the home base stations HBS located in the cell CE of the base station BS. The considered power control inverts the interference path gain, $$f(G^I) = \frac{\beta}{G^I}.$$

where $G^I$ is the interference path gain. The resulting power control with this function is for all the home base stations HBS located in the cell of the base station BS $$P_{i,j}^F = f^F(G_{i,j}^{FM}) = \frac{\beta^F}{G_{i,j}^{FM}}$$

where $P_{i,j}^F$ is the transmit power for a mobile terminal MTj served by a home base station HBSi and $G_{i,j}^{FM}$ is the interference path gain between the mobile terminal MTj served by the home base station HBSi and the base station BS.

The degradation on base station BS due to mobile terminals served by home base stations HBS is for example set on a given level. The degradation on base station BS is defined by the ratio $\alpha$ of mean interference level on base station BS due to mobile terminals MT served by home base stations HBS in the cell CE of the base station BS over mean of AWGN plus interference level on base station BS without the interference due to mobile terminals MT served by home base stations HBS $N^M$.

If we consider a home base station HBS load of $\rho_i$ for home base station HBSi, the total interference $I^{FM}$ from all mobile terminals served by the home base stations HBS at the base station BS is, $$I^{FM} = E\left[\sum_{i=1}^{N_f} a_i \frac{\beta^F}{G_{i,j}^{FM}} G_{i,j}^{FM}\right] = \alpha E[N^M]$$

where $a_i$ is the indicator of activity which is equal to 0 with probability $1-\rho_i$ and 1 with probability $\rho_i$. The load of a base station BS or a home base station HBS is the probability that the resource is used, that is the probability that the activity indicator is equal to one.

The load of a base station BS or of a home base station HBS is linked to a percentage of resources used by the home base station HBS in its cell CEHB. The percentage of resources is preferably a mean over a given time period or is a probability of an amount of resources used by the home base station HBS in its cell CEHB. An indicator of activity equal to 1 means that the resource is used.

After analytical resolution, the global power parameter $\beta^F$ is equal to $$\beta^F = \frac{\alpha \overline{N}^M}{\sum_{i=1}^{N_f} \rho_i} \le \frac{\alpha \overline{N}^M}{N_f}$$

where $\overline{N}^M = E[N^M]$. If we consider full load ($\rho_i = 1, \forall i$), $$\beta^F = \frac{\alpha \overline{N}^M}{N_f}.$$

The expression of the optimum $\beta^F$ value depends on mean noise and possibly on home base stations HBS load.

The statistics flows from a base station BS to the server Serv comprise when the present algorithm is executed by the server Serv, the mean of noise on base station BS $\overline{N}^M = E[N^M]$.

The statistics flows from a home base station BS to the server Serv may comprise when the present algorithm is executed by the server Serv or the statistics flows from a home base station HBS to the base station BS may comprise when the present algorithm is executed by the base station BS, the load of the home base station HBS if it is not estimated by the server Serv or the base station BS based on wired backhaul load.

According to a third example of realization of the present invention, the power setting at the base station BS is already set and a global power setting for the home base stations HBS located in the cell of the base station BS needs to be determined.

Unlike the second example of realization, there is no more a priori structure of the function f.

The function f is common to all home base stations HBS. The structure is a priori free and depends on the path gain between mobile terminals MT served by home base stations HBS and base stations BS.

The degradation $\alpha$ on base station BS due to mobile terminals MT served by home base stations HBS is set on a given level and the home base stations HBS performance level is maximised.

The law of random variables is considered with a quantified probability density function (pdf)

$$G_{n_{bin}}^{FM}; Pr_{n_{bin}}^J{}_{n_{bin}=1\cdots N_{bin}}.$$

$$G_{n_{bin}}^{FM}; Pr_{n_{bin}}^{I}{}_{n_{bin}=1\cdots N_{bin}}$$

describes the law of path gains between mobile terminals MT served by a home base station HBS and base station BS irrespective of the home base station HBS. $G_{n_{bin}}^{FM}$ represents a range of interference path gain and $Pr_{n_{bin}}^{I}$ is the probability of the range. We search a vector $\hat{P}^F$ which corresponds to a maximum of $$\rho N_f \sum_{n_{bin}=1}^{N_{bin}} Pr_{n_{bin}}^{I} \ C \ P_{n_{bin}}^{F}$$

and satisfies the constraint $$\rho N_f \sum_{n_{bin}=1}^{N_{bin}} G_{n_{bin}}^{FM} Pr_{n_{bin}}^{I} P_{n_{bin}}^{F} = \alpha E[N^M]:$$

$$\hat{P}^F = \arg\max_{P^F \mid \rho N_f \sum_{n_{bin}=1}^{N_{bin}} G_{n_{bin}}^{FM} Pr_{n_{bin}}^{I} P_{n_{bin}}^{F} = \alpha E[N^M]} \left( \rho N_f \sum_{n_{bin}=1}^{N_{bin}} Pr_{n_{bin}}^{I} \ C \ P_{n_{bin}}^{F} \right)$$

where, $P^F=[P_1^F, P_2^F, \ldots, P_{N_{bin}}^F]$, $P_{n_{bin}}^F$ is the common transmit power solution corresponding to the path gain $G_{n_{bin}}^{FM}$ and $\rho$ is a constant load over all home base stations.

$$\hat{Z} = \arg\max_{Z \mid constraint} F \ Z$$

denotes a value $\hat{Z}$ of Z which corresponds to a maximum value of the function F Z and satisfies the constraint constraint. Alternatively, if the load is different among home base stations HBS, the load of each home base station HBS is included in $$G_{n_{bin}}^{FM}; Pr_{n_{bin}}^{I}{}_{n_{bin}=1\cdots N_{bin}}.$$

The function C P is the performance metric where P is the transmit power. For instance, C P is approximately equal to $\log_2 1+\gamma P$, which is a home base station HBS Shannon capacity bound on mean performance over all home base stations HBS performances if $\gamma$ is the mean ratio over the home base stations HBS of the path gain between mobile terminals MT served by a home base station HBS and the home base station HBS and AWGN plus interference level received on home base station HBS which may be common to all home base stations HBS.

C P may be a home base station HBS Shannon capacity bound on a cell-edge performance if $\gamma$ is a quantile of the ratio of the path gain between mobile terminals MT served by a home base station HBS and the home base station HBS and AWGN plus interference level received on home base station HBS common to all home base stations HBS.

A quantile $u_Q=Q_u(P)$ is the value $u_Q$ of u such that the probability that u is lower than $u_Q$ is equal to P.

$\gamma$ is considered as a constant value for all the home base stations HBS, e.g., the mean of ratio of path gain between mobile terminals MT served by a home base station HBS and the home base station HBS and AWGN plus interference level received on home base station HBS.

After analytical optimisation:

$$P^F = f \ G^{FM} = \frac{1}{\gamma} \left( \frac{\frac{\gamma \alpha \overline{N}^M}{\rho N_f} + \overline{G}^{FM}}{G^{FM}} - 1 \right)$$

where $\overline{G}^{FM}=E[G^{FM}]$ is the mean over all home base stations HBS of interference path gain between a mobile terminal MT served by a home base station HBS and the base station BS. The $\gamma$ value can be chosen arbitrarily or set in order to limit the occurrences of zero transmit power.

After maximisation, the mean performance metric $C_{mean}$ over all home base stations HBS is $$C_{mean} = \rho \left( \log \left( \frac{\gamma \alpha \overline{N}^M}{\rho N_f \times {}^G\overline{G}^{FM}} + \frac{\overline{G}^{FM}}{{}^G\overline{G}^{FM}} \right) \right),$$

where ${}^G\overline{G}^{FM}$ is the geometrical mean, $$^G\overline{G}^{FM} = 10^{\overline{\log_{10}(G^{FM})}}.$$

Another way of performing appropriate power control, instead of maximising $C_{mean}$ for a given home base station HBS degradation $\alpha$, is to minimize the base station BS degradation $\alpha$ for a given mean performance metric $C_{mean}$.

$P^F$ equation only involves parameters common to all home base stations HBS, except $G^{FM}$. In order to make the function f available to all home base stations HBS, the two following parameters are broadcasted:

$$\beta_1^F = \frac{1}{\gamma}$$

$$\beta_2^F = \frac{\gamma \alpha \overline{N}^M}{\rho \overline{N}_f} + \overline{G}^{FM}$$

According to $P^F$ equation, the function f is $$f \ G^{FM} = \beta_1^F \left( \frac{\beta_2^F}{G^{FM}} - 1 \right)$$

Thus, $$P_{i,j}^F = \beta_1^F \left( \frac{\beta_2^F}{G_{i,j}^{FM}} - 1 \right).$$

The expression of optimum $\beta_1^F$ and $\beta_2^F$ values depends on mean noise, mean of mobile terminals served by home base station HBS to base station BS interference path gain and load of each home base station HBS.

The statistics flows from a base station BS to the server Serv comprise when the present algorithm is executed by the server Serv, the mean of noise on base station BS $\overline{N}^M=E[N^M]$.

The statistics flows from a home base station BS to the server Serv are when the present algorithm is executed by the server Serv or the statistics flows from a home base station HBS to the base station BS are when the present algorithm is executed by the base station BS, the mean of mobile terminal MT served by a home base station to base station BS interference path gain $\overline{G}_i^{FM} = E[G_i^{FM}]$ and may comprise the load of the home base station. At the server Serv or base station BS, $\overline{G}^{FM}$ is obtained from plural $\overline{G}_i^{FM}$. For example, $\overline{G}^{FM}$ is the mean of plural $\overline{G}_i^{FM}$.

These statistics are transferred to the server Serv or to the base station BS. Each home base station HBS sends one or two values to the server Serv or to the base station BS. The base station BS sends one value to the server Serv if the server Serv executes the present algorithm. The server Serv or the base station BS processes the statistics and outputs two beta values $\beta_1^F$ and $\beta_2^F$ for all the home base stations HBS.

According to a variant of the third example of realization of the present invention, the power setting at the base station BS is already set and a global power setting for the home base stations HBS located in the cell of the base station BS needs to be determined.

The function f which optimizes a given criterion is also searched.

The function f is common to all home base stations HBS. The structure is a priori free and depends on the interference and useful path gains.

The degradation $\alpha$ on base station BS due to home base stations HBS is set on a given level and the home base stations HBS performance level is maximised.

The laws of random variables are $$G_{n_{bin}}^{FM} ; Pr_{n_{bin}}^I {}_{n_{bin}=1\cdots N_{bin}}$$

for the path gain between a mobile terminal MT served by a home base station HBS and a base station BS and $$y_{m_{bin}} ; Pr_{m_{bin}}^U {}_{m_{bin}=1\cdots M_{bin}}$$

for the path gain between a mobile terminal MT served by a home base station HBS and the home base station HBS or the ratio of this path gain over the AWGN plus interference level received at home base station HBS.

$$G_{n_{bin}}^{FM} ; Pr_{n_{bin}}^I {}_{n_{bin}=1\cdots N_{bin}} \text{ and } y_{m_{bin}} ; Pr_{m_{bin}}^U {}_{m_{bin}=1\cdots M_{bin}}$$

describe the laws for all home base stations. In other words, the laws are irrespective of the home base station HBS.

The path gain or the ratio of path gain over the AWGN plus interference level may be replaced by any parameter representing the link quality between a mobile terminal MT served by a home base station HBS and a base station BS or a mobile terminal MT served by a home base station HBS and the home base station HBS. We consider, $$\hat{P}^F = \arg \max_{P^F | \rho N_f \sum_{n_{bin}=1}^{N_{bin}} G_{n_{bin}}^{FM} Pr_{n_{bin}}^I P_{n_{bin}}^F = \alpha E[N^M]} (Val)$$

where, $Val = \left( \rho N_f \sum_{m_{bin}=1}^{N_{bin}} \sum_{n_{bin}=1}^{N_{bin}} Pr_{m_{bin}}^U Pr_{n_{bin}}^I C P_{n_{bin}}^F y_{m_{bin}} \right), P_{n_{bin},m_{bin}}^F$ is the common transmit power solution corresponding to the path gain $G_{n_{bin}}^{FM}$ and the path gain $y_{m_{bin}}$.

The function C P, y is the performance metric, where y is the path gain between a mobile terminal MT served by a home base station HBS and the home base station HBS or the ratio of path gain between a mobile terminal MT served by a home base station HBS and the home base station HBS over the AWGN plus interference level at home base station HBS.

For instance, C P, y is approximately equal to $\log_2 1+\gamma yP$, which is a home base station HBS Shannon capacity bound on performance if y is the path gain between a mobile terminal MT served by a home base station HBS and the home base station HBS and $\gamma$ is the mean over all home base station cells of the inverse of AWGN plus interference level received on home base stations HBS which is common to all home base stations HBS.

For instance, C P, y is approximately equal to $\log_2 1+\gamma yP$, which is a home base station HBS Shannon capacity bound on performance if y is the ratio of the path gain between a mobile terminal MT served by a home base station HBS and the home base station HBS over the AWGN plus interference level and $\gamma$ is a constant.

For instance, C P, y is approximately equal to $\log_2 1+\gamma yP$, which is a home base station HBS Shannon capacity bound on a cell-edge performance if y is the path gain between a mobile terminal MT served by a home base station HBS and the base station HBS and $\gamma$ is a quantile of the inverse of AWGN plus interference level received on home base station HBS common to all home base stations HBS.

$\gamma$ is considered as a constant value for all the home base stations HBS, e.g., the mean of the inverse of AWGN plus interference level received on home base stations HBS if y is the path gain between a mobile terminal MT served by a home base station HBS and the home base station HBS.

After analytical optimisation:

$$P^F = f \; G^{FM},$$

$$y = \frac{1}{\gamma} \left( \frac{\frac{\gamma \alpha \overline{N}^M}{\rho N_f} + \overline{z}}{G^{FM}} - \frac{1}{y} \right) \text{ where } \overline{z} = E\left[\frac{G^{FM}}{y}\right] \approx E[G^{FM}] \times E\left[\frac{1}{y}\right] = \frac{\overline{G}^{FM}}{H_{\overline{y}}}$$

is the mean over all the home base stations HBS of ratio of the path gain between the mobile terminals MT served by a home base station HBS and the base station BS $G^{FM}$ over the path gain y between the mobile terminals MT served by a home base station HBS and the home base station HBS. If y is path gain between the mobile terminals MT served by a home base station HBS and the home base station HBS, $$\overline{z} = \frac{\overline{G}^{FM}}{H_{\overline{G}^F}}$$

or if y is the ratio of the path gain between the mobile terminals MT served by a home base station HBS and the home base station HBS over the AWGN plus interference level at home base station HBS, $$\bar{z} = \frac{\bar{G}^{FM} \bar{N}^F}{{}^H\bar{G}^F}.$$

${}^H\bar{x}$ denotes the harmonic mean of x.

The global means $\bar{G}^{FM}$, ${}^H\bar{G}^F$ and $\bar{N}^F$ can be computed at the base station BS or by the server Serv based on individual means for each home base station HBS, $$\bar{G}^{FM} = \sum_{i=1}^{N_f} \rho_i \bar{G}_i^{FM}$$

$$^H\bar{G}^F = \frac{1}{\sum_{i=1}^{N_f} \rho_i \frac{1}{{}^H\bar{G}_i^F}}$$

$$\bar{N}^F = \sum_{i=1}^{N_f} \rho_i \bar{N}_i^F$$

where $N_i^F$ is the level of AWGN plus interference from neighbouring cells CE of the cell of the base station BS where the home base station HBS is located and from the base station BS at the home base station HBS.

The γ value can be chosen arbitrarily or set in order to limit the occurrences of zero transmit power due to the subtraction in the equation defining $P^F$.

The mean performance metric $C_{mean}$ over all home base stations HBS is, $$C_{mean} = N \log\left(\frac{\gamma \frac{\alpha \bar{N}^M}{\rho \bar{N}_f} + \bar{z}}{G_{\bar{z}}}\right),$$

where $$G_{\bar{z}=10}^{\overline{\log_{10}\left(\frac{G^{FM}}{G^F}\right)}}$$

if y is the path gain between the mobile terminals MT served by a home base station HBS and the home base station HBS, or $$G_{\bar{z}=10}^{\overline{\log_{10}\left(\frac{G^{FM} N^F}{G^F}\right)}}$$

if y is the ratio of the path gain between the mobile terminals MT served by a home base station HBS and the home base station HBS over the AWGN plus interference level at home base station HBS.

Another way of performing appropriate power control, instead of maximising $C_{mean}$ for a given base station BS degradation α, is to minimize the base station BS degradation α for a given mean performance metric $C_{mean}$.

The equation defining $P^F$ only involves parameters common to all home base stations HBS, except $G^{FM}$ and y. Thus, in order to make the function f available to all home base stations, the two following parameters are broadcasted:

$$\beta_1^F = \frac{1}{\gamma}$$

$$\beta_2^F = \frac{\gamma \alpha \bar{N}^M}{\rho \bar{N}_f} + \bar{z}$$

According to the equation defining $P^F$, the function f is $$f(G^1) = \beta_1^F \left(\frac{\beta_2^F}{G^1} - \frac{1}{y}\right)$$

So, $$P_{i,j}^F = \beta_i^F \left(\frac{\beta_2^F}{G_{i,j}^{FM}} - \frac{1}{y_{i,j}}\right).$$

The statistics flows from a base station BS to the server Serv comprise when the present algorithm is executed by the server Serv, the mean of noise on base station BS $\bar{N}^M = E[N^M]$.

The statistics flows from a home base station BS to the server Serv when the present algorithm is executed by the server Serv or the statistics flows from a home base station HBS to the base station BS when the present algorithm is executed by the by the base station BS comprise the mean of the path gain between mobile terminal MT served by a home base station HBS and the base station BS $\bar{G}_i^{FM} = E[G_1^{FM}]$, the harmonic mean of the path gain between mobile terminal MT served by a home base station HBS and the home base station HBS ${}^H\bar{G}_i^F = 1/E[1/G_i^F]$, and the mean of the noise on home base station HBS $\bar{N}_i^F = E[N_i^F]$ and may comprise the home base station HBS load.

According to a fourth example of realization of the present invention, the power setting is determined according to a numerical optimization.

Unlike the analytical approach, as disclosed in the above mentioned example, the server Ser or the base station BS processes a numerical optimization. The numerical approach allows to take into account more precise performance metrics like spectral efficiency with saturation, scheduling effects, outage or mean spectral efficiency and is particularly suited to look-up tables LUTs linking for example middle-scale SINR and metric performance. The numerical approximation may be advantageous in order to consider other statistics for global performance on all home base stations HBS, e.g., quantile of mean metrics performances, quantile of quantile metrics performances, global quantiles, . . . .

For example, the function f is defined according to a vector $\beta_v$, stored in a LUT which may contain all possible values for path gains and corresponding transmit power:

$$\{P_{m,n}^F, S_m^{G^F}, S_n^{G^{FM}}\}_{m=1\cdots N_i^{G^F}, n=1\cdots N^{G^{FM}}}.$$

$$S_m^{G^F} = [G_m^{F-}, G_m^{F+}[, m = 1\cdots N^{G^F}$$

$$S_n^{G^{FM}} = [G_n^{FM-}, G_n^{FM+}[, n = 1\cdots N^{G^{FM}}$$

where $P_{m,n}^F$ is the transmit power corresponding to a $G^F$ which is comprised in $[G_m^{F-}, G_m^{F+}[$ and represented by scalar value $S_m^{G^F}$ and corresponding to a $G^{FM}$ which is comprised in $[G_n^{FM-}, G_n^{FM+}[$ and represented by scalar value $S_n^{G^{FM}}$.

Thus, we have $(N^{G^F}+N^{G^{FM}})+N^{G^F}N^{G^{FM}}$ scalar parameters in the $\beta_v$ vector. The relation f is described by, $$n' = \sum_{n=1}^{N^{G^{FM}}} n \times 1_{G^{FM} \in [G_n^{FM-}, G_n^{FM+}[}$$

$$m' = \sum_{n=1}^{N^{G^F}} m \times 1_{G^F \in [G_m^{F-}, G_m^{F+}[}$$

$$P^F = P^F_{m',n'}$$

or more simply m' and n' are chosen as the indices of $S_{m'}{}^{G^F}$ and $S_{n'}{}^{G^{FM}}$ which are the nearest to $G^F$ and $G^{FM}$, respectively. $1_{x \in \chi}$ equals 1 if $x \in \chi$ and 0 otherwise. In the following, $P^F G^F$, $G^{FM} = P^F_{m',n'}$.

In a variant, $P^F G^F$, $G^{FM}$ may be determined from interpolation with $P^F$ values corresponding to several m' and n'.

As in previous examples, $$P^F = \arg \frac{\max_{P^F} \left| E\left[\sum_{i=1}^{N_f} a_i G_i^{FM} P_i^F G_i^{FM}, G_i^F\right] - \alpha E[N^M] \right|}{Q_{\sum_{i=1}^{N_f} a_i Q_{CP_i^F G_i^{FM}, G_i^F, G_i^F, N_i^F}}^{(P_{out})}}$$

A quantile $u_Q = Q_u(P_{out})$ is the value $u_Q$ of u such that the probability that u is lower than $u_Q$ is equal to $P_{out}$. For example, $P_{out}=5\%$.

Instead of two quantiles in the above formula, a mean and a quantile may be also chosen, or a single global quantile may also be chosen.

Instead of having a being the ratio of means, $\alpha$ may be the mean of the ratio $$\frac{1}{N^M} \sum_{i=1}^{N_f} a_i G_i^{FM} P_i^F G_i^{FM},$$

$G_i^F$ or a quantile of this ratio.

In the above formula, several random variables appear. The activity variable $a_i$, the path gain $G_i^{FM}$ between a mobile terminal MT served by a home base station HBSi and the base station BS, the path gain $G_i^F$ between a mobile terminal MT served by the home base station HBSi and the home base station HBSi and the AWGN plus interference level at the home base station HBSi $N_i^F$. $N_i^F$ is the level of AWGN plus interference from neighbouring cells CE of the cell of the base station BS where the home base station HBS is located and from the base station BS at the home base station HBS.

The independency between home base stations HBS and between the different variables may be used. The probability law of $G_i^F$ may be considered identical for all home base stations HBS. Considering the independency, the constraint can be rewritten as $$E\left[\sum_{i=1}^{N_f} a_i G_i^{FM} P_i^F\right] = \sum_{i=1}^{N_f} \rho_i E[G_i^{FM} P_i^F] = \alpha E[N^M].$$

For example, the function f does not depend on base station BS and home base stations HBS positions and environment, i.e., on a particular deployment, and the same law is applicable to plural base stations. The probability law of $G_i^{FM}$ is common to all base stations BS and home base stations HBS.

For example, the function f depends on base station BS and home base stations HBS positions and environment, i.e. on a particular deployment. The probability law of $G_i^{FM}$ is function of i, especially the mean, and the variances are smaller than the previous example.

For example, all laws are considered log-normal and independent. Then only the mean and standard deviation of the variable in logarithm scale are needed.

The optimization may consist in generating multiple scenarios $G_i^F$, $G_i^{FM}$, $N_i^F$, $N^M_j$, $j=1, \ldots, N_s$, based on specified probability laws, which are for example log-normal, executing several iterations for each scenario of choosing a potential transmit power vector $P_1^F, \ldots, P_{N_f}^F$ satisfying the constraint $$E\left[\sum_{i=1}^{N_f} a_i G_i^{FM} P_i^F\right] = \alpha E[N^M],$$

computing the capacity C $P_i^F$, $G_i^F$, $N_i^F$ of each active home base station HBS, building capacity statistics on all scenarios, comparing between present statistics and previous ones, defining the gradient of the transmit power vector $\beta_v$ and keeping the transmit power table that leads to the maximum criterion.

Optimum $\beta_v$ depends on at least a part of the following statistics:

the statistics flows from a base station BS to the server Serv comprise when the present algorithm is executed by the server Serv, the mean of noise on base station BS $\overline{N}^M = E[N^M]$, the statistics flows from a home base station HBSi to the server Serv when the present algorithm is executed by the server Serv or the statistics flows from a home base station HBSi to the base station BS when the present algorithm is executed by the base station BS, comprise the mean of the path gain between a mobile terminal MT served by the home base station HBSi and base station BS $\overline{G}_i^{FM} = E[G_i^{FM}]$, the standard deviation of the path gain between a mobile terminal MT served by the home base station HBSi and base station BS $\sigma_{G_i^{FM}} = \sqrt{E[G_i^{FM} - \overline{G}_i^{FM^2}]}$, the mean of the path gain between a mobile terminal MT served by the home base station HBSi and the home base station HBSi $\overline{G}_i^F = E[G_i^F]$, the standard deviation of the path gain between a mobile terminal MT served by the home base station HBSi and the home base station HBSi $\sigma_{G_i^F} = \sqrt{E[G_i^F - \overline{G}_i^{F^2}]}$, the mean of noise on the home base station HBSi $\overline{N}_i^F = E[N_i^F]$ and may comprise the load of the home base station HBSi.

According to a fifth example of realization of the present invention, the power setting is determined according to a numerical optimization of only one parameter of a function of two variables.

The function f has a structure as follows:

$$f\ G^{FM}, G^F = \min\left(\frac{\beta_1}{G^{FM}}, \frac{\beta_1}{\left(\frac{G^{FM}}{G^F}\right)}\frac{\beta_2}{G^F}\right) = \frac{\beta_1}{G^{FM}} \min 1, \beta_2 x$$

-continued $$x = \frac{\frac{G^{FM}}{G^F}}{\left(\frac{G^{FM}}{G^F}\right)}$$

So, we have two scalar parameters in the $\beta=\beta_1, \beta_2$ vector.

Alternatively, the ratio of path gain between a mobile terminal MT served by a home base station HBS and the home base station HBS over AWGN plus interference level at home base station HBS can be considered instead of only the path gain between the mobile terminal MT served by the home base station HBS and the home base station HBS:

$$f\left(G^{FM}, G^F, N^F\right) = \min\left(\frac{\beta_1}{G^{FM}}, \frac{\beta_1}{\left(\frac{G^{FM}}{y}\right)}\frac{\beta_2}{y}\right) = \frac{\beta_1}{G^{FM}}\min(1, \beta_2 x)$$

$$x = \frac{\frac{G^{FM}}{y}}{\left(\frac{G^{FM}}{y}\right)}$$

$$y = \frac{G^F}{N^F}$$

For a sufficiently large number of home base stations HBS, the value of parameter $\beta_2$ remains approximately the same whatever the home base stations HBS locations with respect to base station BS, or shadowing realizations.

As in the fourth example of realization, we want to solve, $$\hat{\beta}_1, \hat{\beta}_2 = \arg\max_{\beta_1,\beta_2 \left| E\left[\sum_{i=1}^{N_f} a_i G_i^{FM} f\left(G^{FM}, G^F; \beta_1, \beta_2\right)\right] = \alpha E[N^M]\right.} Val2$$

$$Val2 = Q_{\sum_{i=1}^{N_f} a_i Q_C\left(f\left(G_i^{FM}, G_i^F; \beta_1, \beta_2, G_i^F, N_i^F\right)\right)^{P_{out}}}(P_{out})$$

For example, $P_{out}=5\%$. Instead of two quantiles in the above formula, a mean and a quantile can be selected, or a single global quantile on all possible links of all home base stations HBS. Instead of having a being the ratio of means, $\alpha$ may be the mean of the ratio $$\frac{1}{N^M}\sum_{i=1}^{N_f} a_i G_i^{FM} P_i^F G_i^{FM},$$

$G_i^F$ or a quantile of the ratio.

In the above formula, several random variables appear. The activity $a_i$ of a home base station HBSi, the path gain $G_i^{FM}$ between a mobile terminal MT served by the home base station HBS$_i$ and the base station BS, the path gain $G_i^F$ between a mobile terminal MT served by the home base station HBSi and the home base station HBSi and the AWGN plus interference level at the home base station HBSi $N_i^F$.

The independency between home base stations HBS and between the different variables may be used. In that case, the probability law of $G_i^F$ can be consider identical for all home base stations HBS.

For example, if we consider the independency, the constraint can be rewritten as $$E\left[\sum_{i=1}^{N_f} a_i G_i^{FM} P_i^F\right] = \sum_{i=1}^{N_f} \rho_i E[G_i^{FM} P_i^F] = \alpha E[N^M]$$

If all laws are considered log-normal and independent, only mean and standard deviation of the variable are needed.

The optimization can consist in generating multiple scenarios $G_i^F$, $G_i^{FM}$, $N_i^F$, $N_j^M$, j=1, . . . , $N_s$, based on specified probability laws, executing plural iterations and for each scenario, choosing a potential couple of parameters $\beta_1, \beta_2$ satisfying the constraint $$E\left[\sum_{i=1}^{N_f} a_i G_i^{FM} P_i^F\right] = \alpha E[N^M],$$

computing capacity C $f(G_i^{FM}, G_i^F; \beta_1, \beta_2, G_i^F, N_i^F)$ for each home base station HBS, building capacity statistics on all scenarios, comparing between present statistics and previous ones, defining the gradient of transmit power vector and keeping the couple of parameters $\beta_1, \beta_2$ that leads to the maximum criterion.

It has to be noted here that, the most flexible approach is to randomly and independently choose all potential couples of parameters.

In order to simplify the process, relationship between the two parameters and the mean noise plus interference level on base station BS may be used when the normalized path gain ratios $x_i$ are independent between different home base stations HBS.

$$\alpha E[N^M] = \beta_1 \sum_{i=1}^{N_f} \rho_i \left(1 - \frac{\int_0^{1/\beta_2} pdf\ x_i\, dx}{Pr\left(x < \frac{1}{\beta_2}\right)} + \beta_2 \int_0^{1/\beta_2} x_i \times pdf\ x_i\, dx\right)$$

So, $$\beta_1 = \frac{\alpha E[N^M]}{\sum_{i=1}^{N_f} \rho_i\left(1 - \frac{\int_0^{1/\beta_2} pdf\ x_i\, dx}{Pr\left(x < \frac{1}{\beta_2}\right)} + \beta_2 \int_0^{1/\beta_2} x_i \times pdf\ x_i\, dx\right)}$$

If path gains are log-normal, $x_i$ is also log-normal and it enables the use of erfc( ) complementary error function to compute the first parameter function of the second parameter and the mean interference level due to home base stations HBS on base stations.

Thus, only $\beta_2$ is to be optimized.

The statistics flows from a base station BS to the server Serv comprise when the present algorithm is executed by the server Serv, the mean of noise on base station BS $\overline{N}^M = E[N^M]$.

If all laws are considered log-normal and independent, the statistics flows from a home base station HBSi to the server Serv are when the present algorithm is executed by the server Serv or the statistics flows from the home base station HBSi to the base station BS when the present algorithm is executed by the base station BS comprise the mean of the path gain between a mobile terminal MT served by the home base station HBSi and the base station BS $\overline{G}_i^{FM} = E[G_i^{FM}]$, the standard deviation of the path gain between a mobile terminal MT served by the home base stations HBSi and the base station BS $\sigma_{G_i^{FM}} = \sqrt{E[G_i^{FM} - \overline{G}_i^{FM^2}]}$, the mean of the path gain between a mobile terminal MT served by the home base stations HBSi and the home base station HBSi $\overline{G}_i^{F} = E[G_i^{F}]$, the standard deviation of the path gain between a mobile terminal MT served by the home base station HBSi and the home base station HBSi $\sigma_{G_i^{F}} = \sqrt{E[G_i^{F} - \overline{G}_i^{F^2}]}$, the mean of noise on the home base station HBSi and may comprise the load of the home base station HBSi.

At step S603, the processor 200 commands the transfer of power control information to each home base station HBS comprised in its cell CE through the wireless interface 205 or through the network interface 206.

According to the first example of realization, the processor 200 commands the transfer of the coefficient $\beta_i^F$ to each home base station HBSi comprised in its cell CE.

According to the second example of realization, the processor 200 commands the transfer of the coefficient $\beta^F$ to all home base stations HBS comprised in its cell CE.

According to the third example of realization, the processor 200 commands the transfer of the coefficients $\beta_1^F$ and $\beta_2^F$ to all home base stations HBS comprised in its cell CE.

According to the variant of the third example of realization of the present invention, the processor 200 commands the transfer of the coefficients $\beta_1^F$ and $\beta_2^F$ to all home base stations HBS comprised in its cell CE.

According to the fourth example of realization, the processor 200 commands the transfer of the at most $(N^{G^F} + N^{G^{FM}}) + N^{G^F} N^{G^{FM}}$ values, comprising $N^{G^F}$ discrete $G^F$ values, $N^{G^{FM}}$ discrete $G^{FM}$ values and $N^{G^F} N^{G^{FM}}$ power values.

According to the fifth example of realization, the processor 200 commands the transfer of the coefficients $\beta_1$ and $\beta_2$ to all home base stations HBS comprised in its cell CE.

It has to be noted here that if a part or the function f is unknown by base stations or home base stations or mobile terminals, said part or the function f is also transferred.

Alternatively, the processor 400 commands the transfer of power control information to each base station BS the server Serv is in charge of and to each home base station HBS comprised in the cell of each base station BS the server Serv is in charge of through the network interface 406.

According to the first example of realization, the processor 400 commands the transfer of the coefficient $\beta^M$ to each base station BS the server Serv is in charge of and the transfer of the coefficient $\beta_i^F$ to each home base station HBSi comprised in the cell of each base station BS the server Serv is in charge of.

According to the second example of realization, the processor 400 commands the transfer of the coefficient $\beta^F$ to all home base stations HBS comprised in the cell of each base station BS the server Serv is in charge of.

According to the third example of realization, the processor 400 commands the transfer of the coefficients $\beta_1^F$ and $\beta_2^F$ to all home base stations HBS comprised in the cell of each base station BS the server Serv is in charge of.

According to the variant of the third example of realization of the present invention, the processor 400 commands the transfer of the coefficients $\beta_1^F$ and $\beta_2^F$ to all home base stations HBS comprised in the cell of each base station BS the server Serv is in charge of.

According to the fourth example of realization, the processor 400 commands the transfer of the at most $(N^{G^F} + N^{G^{FM}}) + N^{G^F} N^{G^{FM}}$ values, comprising $N^{G^F}$ discrete $G^F$ values, $N^{G^{FM}}$ discrete $G^{FM}$ values and $N^{G^F} N^{G^{FM}}$ power values to all home base stations HBS comprised in the cell of each base station BS the server Serv is in charge of.

According to the fifth example of realization, the processor 400 commands the transfer of the coefficients $\beta_1$ and $\beta_2$ to all home base stations HBS comprised in the cell of each base station BS the server Serv is in charge of.

After that, the processor 200 returns to step S600.

Alternatively, the processor 400 returns to step S600.

FIG. 7 discloses an algorithm executed by each home base station and each base station according to the present invention.

More precisely, the present algorithm is executed by the processor 200 of the base station BS and by the processor 300 of each home base station HBS each time power control information is received.

At step S700, the processor 200 receives power control information as the one transferred by the server Serv as disclosed at step S603 of the algorithm of FIG. 6 or retrieves the power control information from the RAM memory 203.

At the same step, each processor 300 receives power control information as the one transferred by the server Serv or the base station BS as disclosed at step S603 of the algorithm of FIG. 6.

At next step S701, the processor 200 commands the transfer through the wireless interface 205, of the power control information to each mobile terminal MT served by the base station BS.

In a variant, the transmission power is transferred to each mobile terminal MT served by the base station BS.

At the same step, each processor 300 commands the transfer through the wireless interface 305, of the power control information to each mobile terminal MT served by the home base station HBS.

In a variant, the transmission power is transferred to each mobile terminal MT served by the home base station BS.

The processor 200 or 300 executes the step S701 as far as no power control information is received.

Naturally, many modifications can be made to the embodiments of the invention described above without departing from the scope of the present invention.

The invention claimed is:

1. A method for adjusting transmission power, in a wireless cellular telecommunication network, of signals transferred by plural mobile terminals through a wireless interface, the mobile terminals being served by at least one base station or by home base stations, the home base stations being located in a cell of the at least one base station, the method comprising:
   obtaining path gains between the mobile terminals and the at least one base station and path gains between the mobile terminals and at least one home base station, and/or noise measured at the at least one base station and/or at the home base stations;
   determining statistics from the obtained path gains and/or noise;
   obtaining at least one coefficient of a function according to at least a part of the statistics determined from the obtained path gains and/or noise; and
   transferring an information representative of the at least one obtained coefficient to the mobile terminals to enable the mobile terminals to transfer signals at a transmission power derived from information representative of the at least one obtained coefficient.

2. A method according to claim 1, wherein for mobile terminals served by the at least one base station, the path gains between the mobile terminals and home base stations located in the cell of the at least one base station which serves the mobile terminals are obtained, and for mobile terminals served by home base stations, each path gain between a mobile terminal and only the home base station serving the mobile terminal is obtained.

3. A method according to claim 1, wherein the function is defined for a continuous range of real values or a plurality of coefficients are obtained, the coefficients being entries of a table representing the function.

4. A method according to claim 1, wherein each path gain is a path gain between one home base station serving one mobile terminal and the mobile terminal, or the path gain between one base station serving one mobile terminal and the mobile terminal, or the path gain between one home base station not serving one mobile terminal and the mobile terminal, or the path gain between one base station not serving one mobile terminal and the mobile terminal.

5. A method according to claim 1, wherein a set of at least one coefficient of the function is determined for each home base station and for the at least one base station.

6. A method according to claim 1, wherein a same set of at least one coefficient is determined for all the home base stations.

7. A method according to claim 1, wherein the path gains are obtained by the home base stations and the at least one base station and statistics are determined by the home base stations and the at least one base station.

8. A method according to claim 1, wherein the at least one coefficient of the function is obtained by the base station or by a server of the wireless cellular telecommunication network.

9. A method according to claim 1, wherein information representative of the at least one obtained coefficient is transferred to each mobile terminal via the base station serving the mobile terminal or via the home base station serving the mobile terminal.

10. A method according to the claim 9, wherein when the at least one coefficient of the function is obtained by the server, the at least one base station transfers to the server the harmonic mean of noise measured at the at least one base station, and/or the mean of noise measured at the at least one base station, and/or the mean over all mobile terminals served or having been served by the at least one base station of ratios of the path gain between a mobile terminal and a home base station over the path gain between the mobile terminal and its serving base station.

11. A method according to the claim 9, wherein each home base station transfers to the base station in the cell of which the home base station is located or to the server, the mean over all mobile terminals served or having been served by the home base station of ratio of the path gain between a mobile terminal served by a home base station and the base station over the path gain between the mobile terminal served by a home base station and the home base station, and/or the harmonic mean of noise measured at the home base station, and/or the mean of the noise measured at the home base station, and/or the mean over all mobile terminals served or having been served by the home base station of the path gain between a mobile terminal served by a home base station and the base station, and/or the standard deviation over all mobile terminals served or having been served by the home base station of the path gain between a mobile terminal served by a home base station and the base station, and/or the load of the home base station, and/or the harmonic mean over all mobile terminals served or having been served by the home base station of the path gain between a mobile terminal served by a home base station and the home base station, the mean over all mobile terminals served or having been served by the home base station of the path gain between a mobile terminal served by the home base station and the home base station, and/or the standard deviation over all mobile terminals served or having been served by the home base station of the path gain between a mobile terminal served by the home base station and the home base station.

12. A system for adjusting the transmission power, in a wireless cellular telecommunication network, of signals transferred by plural mobile terminals through a wireless interface, the mobile terminals being served by at least one base station or by home base stations, the home base stations being located in the cell of the at least one base station, the system comprising:
  means for obtaining path gains between the mobile terminals and the at least one base station and path gains between the mobile terminals and the home base stations, and/or noise measured at the at least one base station, and/or at the home base stations;
  means for determining statistics from the obtained path gains and/or noise;
  means for obtaining at least one coefficient of a function according to at least a part of the statistics determined from the obtained path gains and/or noise; and
  means for transferring an information representative of the at least one obtained coefficient to the mobile terminals to enable the mobile terminals to transfer signals at a transmission power derived from information representative of the at least one obtained coefficient.

13. A system according to claim 12, wherein the means for obtaining the path gains are comprised in the home base stations and the at least one base station and the means for determining statistics are comprised in the home base stations and the at least one base station.

14. A system according to claim 12, wherein the means for optimizing the at least one coefficient of the function are comprised in the at least one base station or in a server of the wireless cellular telecommunication network.

* * * * *